(No Model.)
D. R. CAMPBELL & N. M. HETZLER.
NUT LOCK.
No. 365,165. Patented June 21, 1887.
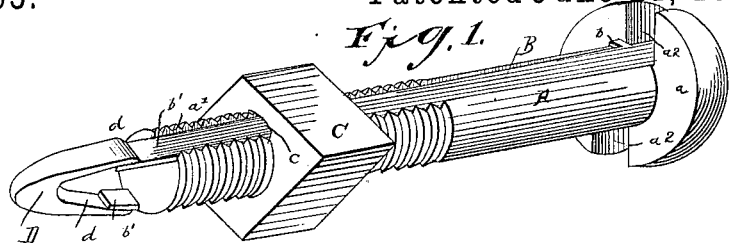
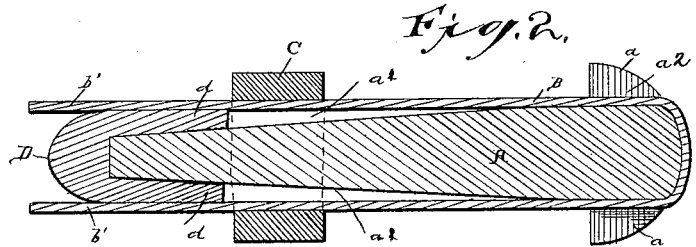
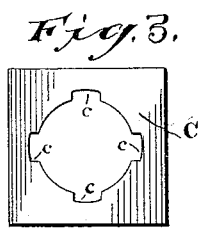
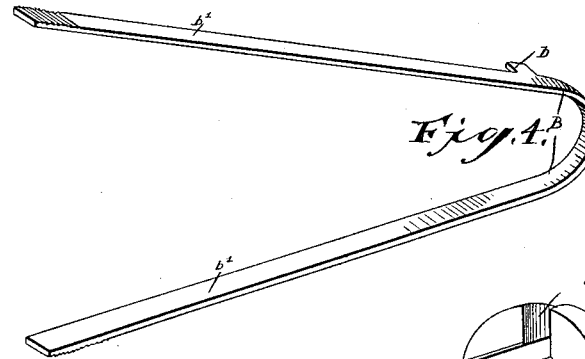
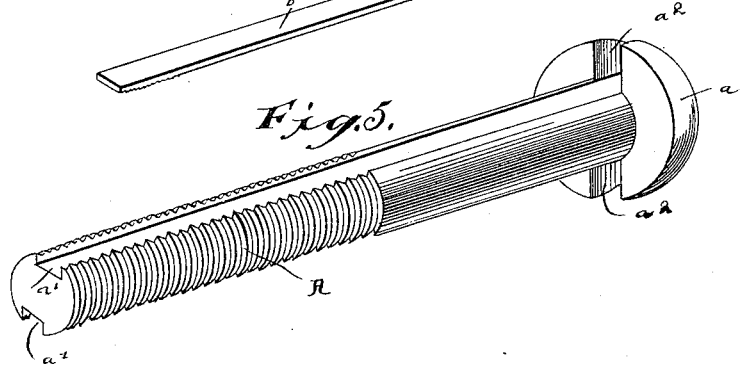
Witnesses
Henry G. Dieterich
Inventors
David R. Campbell
N. M. Hetzler
By their Attorneys,

United States Patent Office.

DAVID RICE CAMPBELL AND NATHANIEL MILLS HETZLER, OF ELLENSBURG, WASHINGTON TERRITORY.

NUT-LOCK.

SPECIFICATION forming part of Letters Patent No. 365,165, dated June 21, 1887.

Application filed April 1, 1887. Serial No. 233,306. (No model.)

*To all whom it may concern:*

Be it known that we, DAVID RICE CAMPBELL and NATHANIEL MILLS HETZLER, citizens of the United States, residing at Ellensburg, in the county of Kittitas, Washington Territory, have invented new and useful Improvements in Nut-Locks, of which the following is a specification.

The invention relates to improvements in nut-locks, the object being to provide a durable and effective device of the kind that will be of simple and strong construction; and it consists, mainly, in the construction and arrangement of the spring and the combination thereof with other parts, as hereinafter described, and pointed out in the appended claims.

In the accompanying drawings, Figure 1 is a perspective view of the improved device. Fig. 2 is a central longitudinal section of the same through the spring and grooves in the bolt. Fig. 3 is a plan view of the nut detached to show the grooves therein. Fig. 4 is a perspective view of the spring detached. Fig. 5 is a perspective view of the bolt alone.

Referring to the drawings by letter, A represents the bolt adapted to pass through openings in two contiguous bars—such as a rail and fish-plate—and provided with the head $a$ and similar longitudinal opposite grooves, $a'$ $a'$, which increase gradually in depth outward through the threaded portion of the bolt and are in line with the notches $a^2$ $a^2$ in the head, the stem of the bolt being flattened below and adjacent to said notches.

B is a spring, bent centrally to fit over the head of the bolt and in the notches $a^2$ and grooves $a'$ $a'$. The spring is provided on one edge with a shoulder, $b$, that when the parts are in position lies upon the flattened part of the stem and impinges against the lower surface or shoulder of the head, so that the spring is prevented from slipping endwise.

C is the nut having in the sides of its threaded opening the opposite grooves, $c$ $c$, into which the legs $b'$ $b'$ of the spring will enter when the latter opens outwardly and the said legs spring apart. By this means the nut is prevented from turning on the bolt.

In screwing the nut on the ends of the legs $b'$ have to be held together to prevent them from springing out too soon into the grooves $c$. This is accomplished by means of the U-shaped clamping-piece D, the legs $d$ $d$ of which are pressed over the legs of the spring, so as to hold them together, as shown in Fig. 1. When the nut is screwed up to the proper position, the said clamping-piece is detached and the legs of the spring allowed to open outward and lock the nut, as described. The clamping-piece may then have its legs $d$ $d$, which are wedge-shaped and roughened on their inner surfaces, driven into the grooves $a'$ $a'$ to keep the legs $b'$ $b'$ expanded. (See Fig. 2.)

The invention as described makes a very convenient, simple, and durable nut-lock, and one that may be readily attached and detached. To detach the same, the clamping-piece D, if inserted in the grooves $a'$, is withdrawn therefrom, the ends of the legs $b'$ $b'$ pressed together, and the nut unscrewed. The bolt and spring can then be readily drawn out of place.

Having described our invention, we claim—

1. In a nut-lock, the combination of the bolt provided with the opposite notches in its head, with its stem flattened slightly below said notches, and having the opposite longitudinal grooves in line with the notches and increasing gradually in depth outward through the threaded part of the stem, the spring bent to fit over the head of the bolt and enter said notches and grooves, and provided with a projection on its edge to abut against the inner surface of the head, and the nut engaging the bolt and provided with opposite interior grooves which engage with the legs of the springs when the parts are in place, substantially as specified.

2. The herein-described nut-lock, consisting of the bolt A, provided with the head $a$, grooves $a'$, and notches $a^2$, the spring B, having the legs $b'$ and projection $b$ on its edge, the nut C, having the opposite interior grooves, $c$, and the clamping-piece D, provided with the wedge-shaped legs $d$, roughened on their inner surfaces, all constructed and arranged substantially as and for the purpose specified.

In testimony that we claim the foregoing as our own we have hereto affixed our signatures in presence of two witnesses.

DAVID RICE CAMPBELL.
NATHANIEL MILLS HETZLER.

Witnesses:
L. POOL,
S. T. PACKWOOD.